United States Patent
Jones et al.

(10) Patent No.: US 6,175,108 B1
(45) Date of Patent: Jan. 16, 2001

(54) ACCELEROMETER FEATURING FIBER OPTIC BRAGG GRATING SENSOR FOR PROVIDING MULTIPLEXED MULTI-AXIS ACCELERATION SENSING

(75) Inventors: Richard T. Jones, Hamden; Robert J. Maron, Cromwell; Guy A. Daigle, Plainville, all of CT (US)

(73) Assignee: CiDRA Corporation, Wallingford, CT (US)

( * ) Notice: Under 35 U.S.C. 154(b), the term of this patent shall be extended for 0 days.

(21) Appl. No.: 09/016,258

(22) Filed: Jan. 30, 1998

(51) Int. Cl.$^7$ .............................. G01P 15/00; G01P 15/08
(52) U.S. Cl. ................................ 250/227.14; 250/227.18; 250/231.1; 73/514.26; 73/514.27
(58) Field of Search ........................... 250/231.1, 227.14, 250/227.11, 227.18; 73/514.01, 514.16, 514.17, 514.19, 514.24, 514.26, 514.27, 514.38, 514.21, 514.23, 514.36; 385/12, 13

(56) References Cited

U.S. PATENT DOCUMENTS

| | | |
|---|---|---|
| 4,376,390 | 3/1983 | Rines . |
| 4,403,144 | 9/1983 | Strahan et al. . |
| 4,419,895 | 12/1983 | Fuller . |
| 4,429,573 | 2/1984 | Walker . |
| 4,534,222 | 8/1985 | Finch et al. . |
| 4,567,771 | 2/1986 | Nelson et al. . |
| 4,595,830 | 6/1986 | McMahon . |
| 4,635,482 | 1/1987 | Walker . |
| 4,671,113 | 6/1987 | Carome . |

(List continued on next page.)

OTHER PUBLICATIONS

"Experimental Demonstration of a Fiber Bragg Grating Accelerometer" by T.A. Berkoff et al., *IEEE Photonics Technology Letters*, vol. 8, No. 12, Dec. 1, 1996, pp. 1677–1679, XP 000679546.

"Opto–mechanical accelerometer based on strain sensing by a Bragg grating in a planar waveguide" by T. Storgaard-Larsen et al., *Sensors and Actuators A*, vol. A52, No. 1/03, Mar. 1, 1996, pp. 25–32 XP 000599972.

Primary Examiner—John R. Lee
(74) Attorney, Agent, or Firm—Ware, Fressola, Van Der Sluys & Adolphson LLP

(57) ABSTRACT

An accelerometer has a main body in combination with one or more Bragg grating sensors respectively arranged along one or more axes. The main body has a mass that responds to an acceleration, for providing a force having a component in one or more axes. The Bragg grating sensor means responds to the force, and further responds to an optical signal, for providing a Bragg grating sensor signal containing information about the acceleration respectively in one or more axes. The one or more axes may include orthogonal axes such as the X, Y and Z Euclidian axes. In one embodiment, the main body includes a proof mass and a pair of flexure disks, each having an inner ring, an outer ring, and radial splines connecting the inner ring and the outer ring. The proof mass is slidably arranged between the flexure disks. The Bragg grating means has an optical fiber and a Bragg grating sensor arranged therein. A first end of the Bragg grating sensor is fixedly coupled by a first ferrule to the proof mass. A second end of the Bragg grating sensor is fixedly coupled by a second ferrule to a housing of the accelerometer. In operation, the compression or stretching of a Bragg grating sensor causes a wavelength shift in the optical signal that contains information about the acceleration and that is sensed by a detector.

12 Claims, 13 Drawing Sheets

U.S. PATENT DOCUMENTS

| | | |
|---|---|---|
| 4,739,661 | 4/1988 | Bucholtz et al. . |
| 4,743,116 | 5/1988 | Udd et al. . |
| 4,755,051 | 7/1988 | Cahill et al. . |
| 4,761,073 | 8/1988 | Meltz et al. . |
| 4,800,267 | 1/1989 | Freal et al. . |
| 4,806,012 | 2/1989 | Meltz et al. . |
| 4,829,821 | 5/1989 | Carome . |
| 4,860,586 | 8/1989 | Miers et al. . |
| 4,876,447 | 10/1989 | Killian . |
| 4,893,930 | 1/1990 | Garrett et al. . |
| 4,900,918 | 2/1990 | Killian . |
| 4,900,919 | 2/1990 | Twerdochlib . |
| 4,930,862 | 6/1990 | Miers et al. . |
| 4,950,883 | 8/1990 | Glenn . |
| 4,996,419 | 2/1991 | Morey . |
| 5,061,069 | 10/1991 | Califano . |
| 5,099,690 | 3/1992 | Califano . |
| 5,134,882 | 8/1992 | Taylor . |
| 5,155,548 | 10/1992 | Danver et al. . |
| 5,276,322 | 1/1994 | Carome . |
| 5,292,569 | 3/1994 | Barry et al. . |
| 5,308,973 | 5/1994 | Odoni et al. . |
| 5,317,929 | 6/1994 | Brown et al. . |
| 5,339,696 | 8/1994 | Carignan . |
| 5,361,130 | 11/1994 | Kersey et al. . |
| 5,369,485 | 11/1994 | Hofler et al. . |
| 5,401,956 | 3/1995 | Dunphy et al. . |
| 5,420,688 | 5/1995 | Farah . |
| 5,426,297 | 6/1995 | Dunphy et al. . |
| 5,444,803 | 8/1995 | Kim et al. . |
| 5,451,772 | 9/1995 | Narendran . |
| 5,452,087 | 9/1995 | Taylor et al. . |
| 5,493,113 | 2/1996 | Dunphy et al. . |
| 5,493,390 | 2/1996 | Varsai et al. . |
| 5,495,892 | 3/1996 | Carisella . |
| 5,507,341 | 4/1996 | Eslinger et al. . |
| 5,513,913 | 5/1996 | Ball et al. . |
| 5,529,346 | 6/1996 | Sperring . |
| 5,564,504 | 10/1996 | Carisella . |
| 5,633,960 | 5/1997 | Lagakos et al. . |
| 5,892,860 | 4/1999 | Maron et al. . |
| 5,925,879 * | 7/1999 | Hay ................... 250/227.14 |
| 5,945,665 * | 8/1999 | Hay ................... 250/227.14 |
| 5,973,317 * | 10/1999 | Hay ................... 250/227.14 |

* cited by examiner

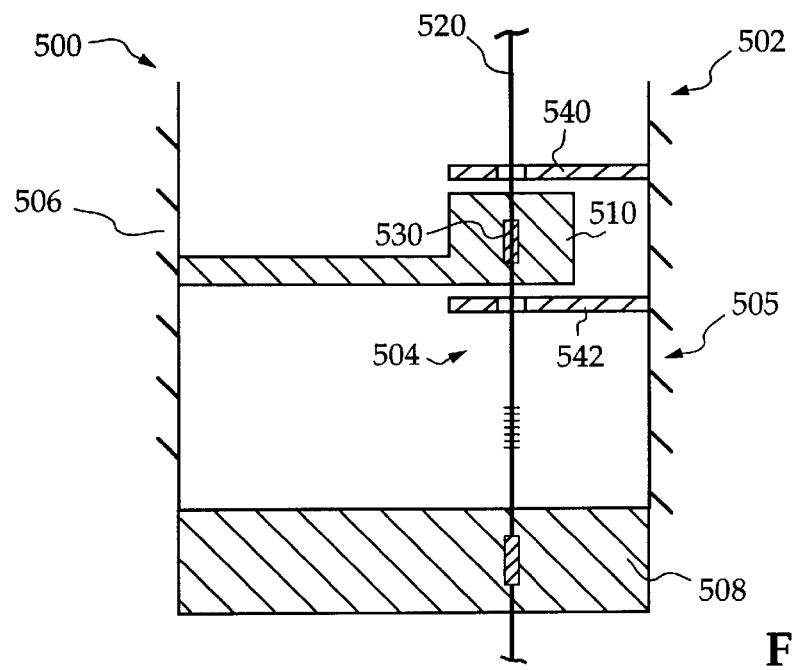
FIG. 6a
FIG. 6b
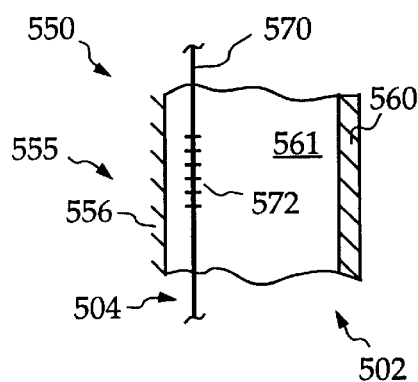
FIG. 6c
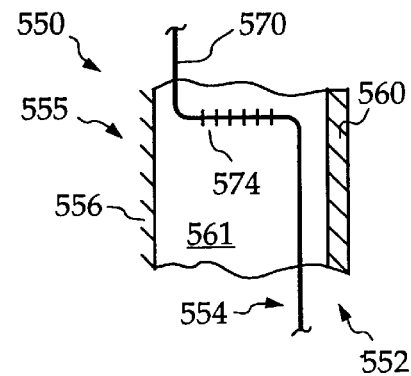

ACCELEROMETER FEATURING FIBER OPTIC BRAGG GRATING SENSOR FOR PROVIDING MULTIPLEXED MULTI-AXIS ACCELERATION SENSING

TECHNICAL FIELD

The present invention relates to an accelerometer; and more particularly, to an accelerometer using an optical fiber.

BACKGROUND OF INVENTION

Accelerometers are known in the prior art that use an optical fiber. Such accelerometers measure acceleration by sensing optical fiber surface strain, by sending optical fiber displacement or microbending, by sensing optical signal intensity, and by sensing optical signal phase shifts.

One disadvantage of the prior art accelerometers is that they are all complicated point sensors that do not allow multiplexing. Instead, a separate prior art accelerometer is needed to sense each respective axis.

SUMMARY OF INVENTION

In its broadest sense, the present invention provides an accelerometer comprising a main body in combination with a Bragg grating sensor means having an optical fiber with one or more Bragg grating sensors respectively arranged along one or more axes. The main body has a mass that responds to an acceleration, for providing a force having a component in one or more axes. The Bragg grating sensor means responds to the force, and further responds to an optical signal, for providing a Bragg grating sensor signal containing information about the acceleration respectively in one or more axes. The one or more axes may include orthogonal axes such as the X, Y and Z Euclidian axes.

The main body may include a proof mass and a spring means such as a pair of flexure disks, each having an inner ring, an outer ring, and radial splines connecting the inner ring and the outer ring. The proof mass is slidably arranged between the pair of flexure disks.

The Bragg grating sensor means includes an optical fiber having one or more Bragg grating sensors arranged therein.

In one embodiment, the optical fiber has a first end, a second end, and a Bragg grating sensor arranged between the first end and the second end. The first end of the Bragg grating sensor is fixedly coupled by a first ferrule to the proof mass. The second end of the Bragg grating sensor is fixedly coupled by a second ferrule to a housing of the accelerometer. The optical fiber is fixedly coupled to have a preloaded strain so that compression or stretching of the Bragg grating sensor causes a wavelength shift in the optical signal that contains information about the acceleration and that is sensed by a detector.

The Bragg grating sensor may include either a Bragg grating point sensor, multiple Bragg gratings, or a lasing element formed with pairs of multiple Bragg gratings.

One advantage of the present invention is that acceleration can be sensed using a single optical signal in a multiplexed manner, i.e. a single optical fiber having multiple Bragg grating sensors can be used to sense acceleration along multiple axes of an object.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

FIG. 1a is a cross-section of the embodiment of the present invention.

FIG. 1b is a cross-section of the embodiment shown in FIG. 1 along lines 1b–1b' (without the fiber).

FIG. 1c is a cross-section of the embodiment shown in FIG. 1 along lines 1c–1c'.

FIG. 1d is a graph of an actual accelerometer output and a theoretical accelerometer output plotted as a function of frequency versus amplitude.

FIG. 6a is a diagram of a side view of one embodiment of a cantilever plate accelerometer.

FIG. 6b is a diagram of a front view of another embodiment of a cantilever plate accelerometer.

FIG. 6c is a diagram of a back view of the embodiment of the cantilever plate accelerometer shown in FIG. 6b.

DETAILED DESCRIPTION OF THE INVENTION

The Accelerometer Set Forth in FIGS. 1a to 1d

Figure 1A:
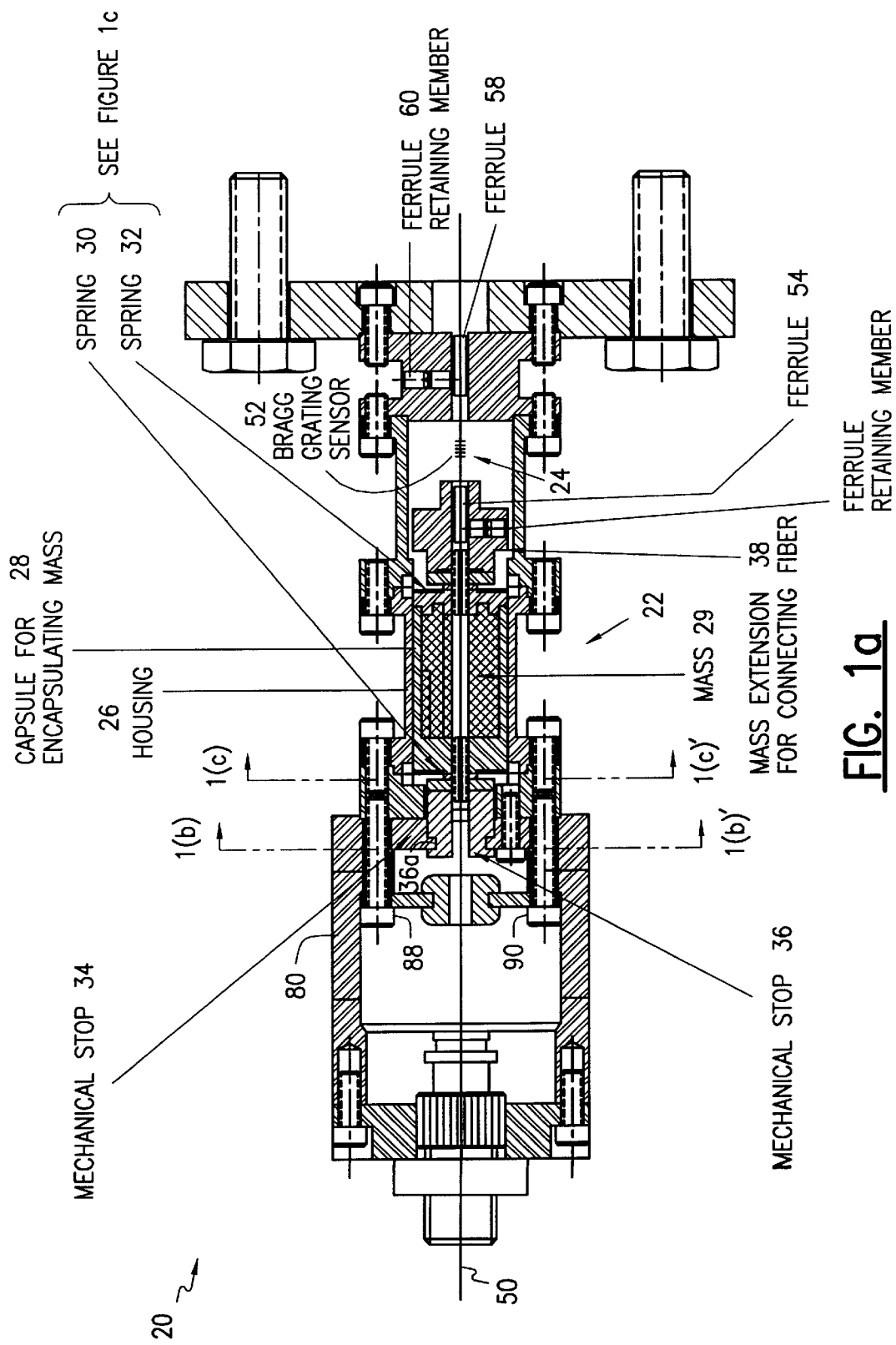
FIGS. 1a to 1d show various Figures related to an embodiment of an accelerometer of the present invention.
Figure 1B:
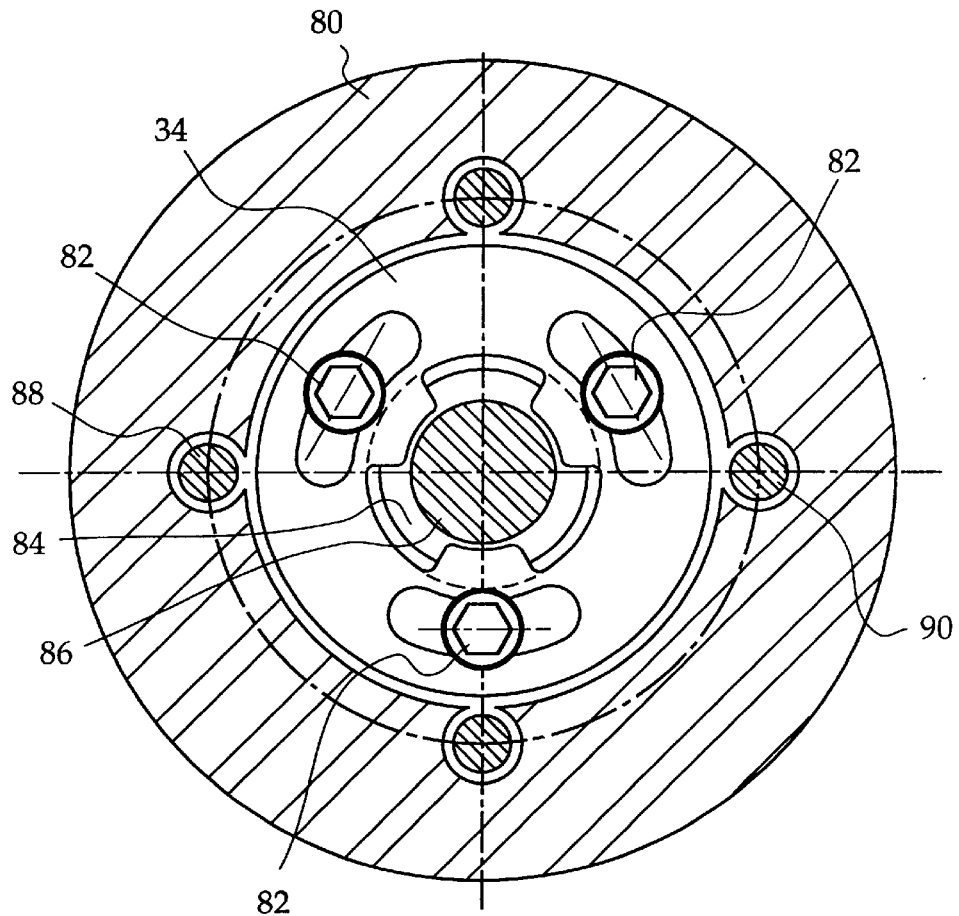
Figure 1C:
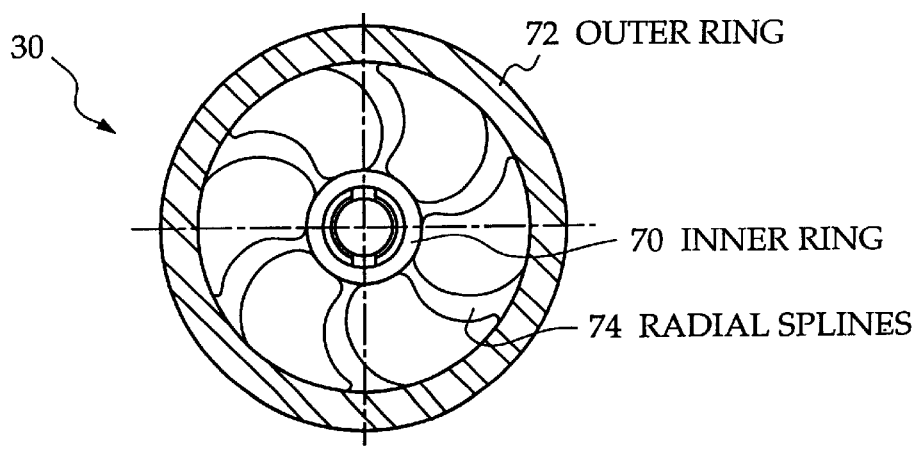
Figure 1D:
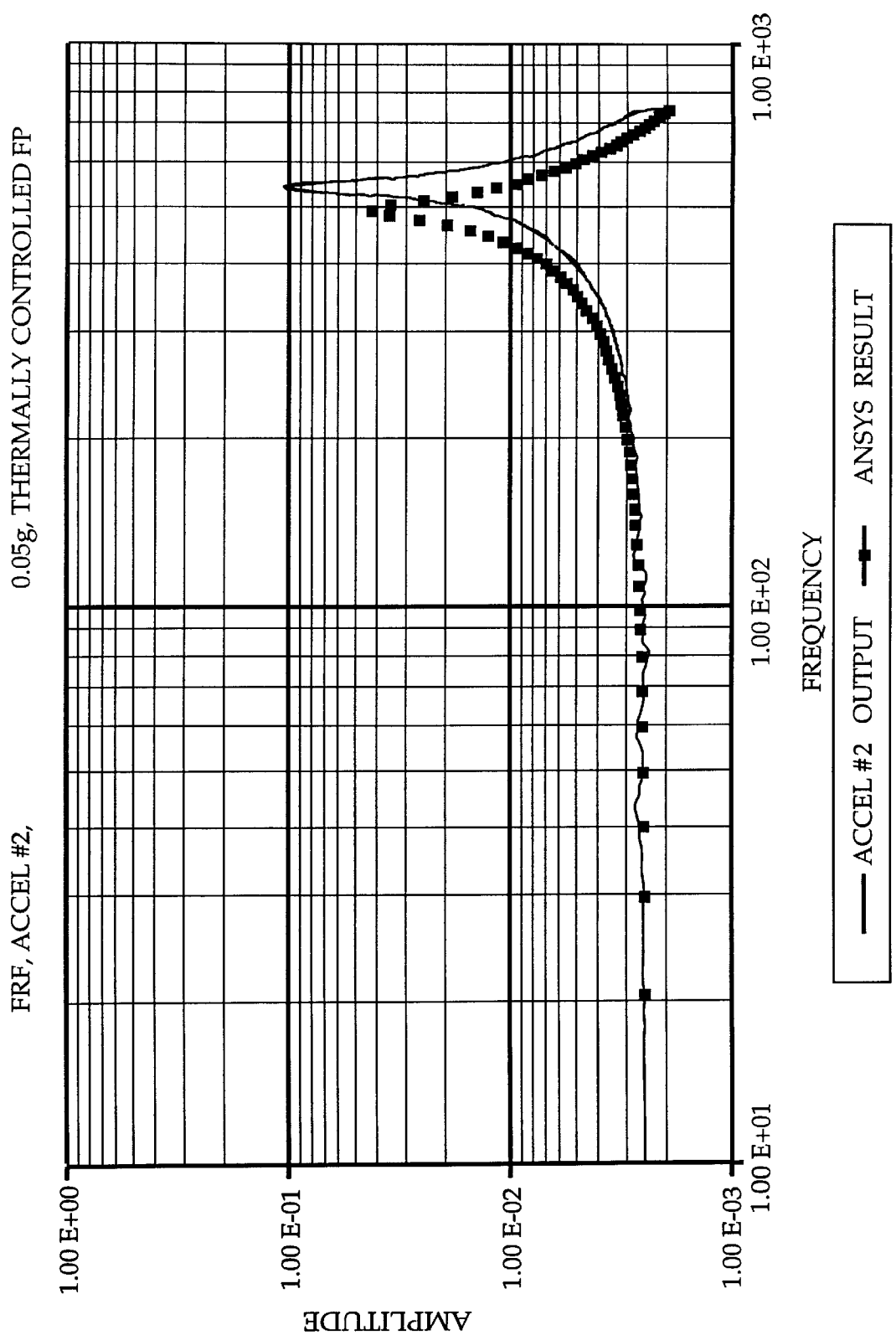

FIG. 1a shows an accelerometer generally indicated as 20 having a main body generally indicated as 22 in combination with a Bragg grating sensor means generally indicated as 24. Any person skilled in the art such as a mechanical engineer would appreciate how the accelerometer 20 operates after viewing FIGS. 1a to 1c. In view of this, a brief description of the accelerometer 20 shown in FIGS. 1a to 1c is provided to assist the reader in understanding the operation of the most important components of the accelerometer 20 (In other words, every single nut and bolt shown in FIGS. 1a–1c is not assigned a reference numeral).

In FIG. 1a, the main body 22 has a housing 26 having a capsule 28 for encapsulating a proof mass 29 that is slidably arranged in the housing 26. The main body 22 also has a spring means such as a pair of flexure disks 30, 32 arranged on each side of the proof mass 29. The pair of flexure disks 30, 32 are each fixedly coupled to the housing 26. The flexure disks 30, 32 are also fixedly coupled to the capsule 28 to allow slidable movement of the proof mass 29 in the housing 26. The flexure disks 30, 32 are shown in greater detail in FIG. 1c.

On one side of the proof mass 29, the main body 22 has mechanical stops generally indicated as 34, 36 that cooperate for stopping the proof mass 29 at a maximum displacement to limit strain on the Bragg grating sensor means 24. On the other side of the proof mass 29, the main body 22 also has a mass extension 38 for connecting to the Bragg grating sensor means 24.

The Bragg grating sensor means 24 has an optical fiber 50 and one or more Bragg grating sensors 52 arranged therein. As shown, the fiber 50 passes completely through the accelerometer 20 and is connected on one fiber end to a light source (not shown), and on the other fiber end to a detector (not shown), as discussed in more detail below.

As shown, a first optical fiber end of the Bragg grating sensor 52 is fixedly coupled by a first ferrule 54 and a ferrule retaining member 56 to the mass extension 38 for connection to the proof mass 29. A second optical fiber end of the Bragg grating sensor is fixedly coupled by a second ferrule 58 and a ferrule retaining member 60 to the housing 26 of the accelerometer 20. As shown, the section of fiber fixedly coupled between the ferrules 54, 58 is about 4/10 of an inch in length, although the scope of the invention is not intended to be limited to any particular length. Moreover, the Bragg grating sensor 52 is fixedly coupled on its optical fiber ends to have a preloaded strain so that compression or stretching of the Bragg grating sensor 52 causes a wavelength shift in an optical signal on the optical fiber 50 that contains information about the acceleration and that is sensed by a detector.

The ferrules 54, 58 may be made of glass or metal, or may also be welded to metallized fiber ends of the Bragg grating sensor, or may be glued to the ends of the Bragg grating sensor, or may be glass bonded to the first and second ends of the Bragg grating sensor.

In operation, the main body 22 and the proof mass 26 respond to an acceleration, for providing a force having a component in one or more axes. The Bragg grating sensor means 24 responds to the force, and further responds to an optical signal, for providing a Bragg grating sensor signal containing information about the acceleration respectively in one or more axes. The one or more axes may include orthogonal axes such as the X, Y and Z Euclidian axes.

In FIG. 1b, the mechanical stop 34 is fixed to an extension of the housing 26 (FIG. 1a) via three bolts 82 which allow the mechanical stop 34 to be rotated into place in relation to the mechanical stop 36. The mechanical stop 36 in FIG. 1a has a groove 36a around the circumferences, and a set of three holes in the top section where the mechanical stop 34 can enter the mechanical stop 36. The mechanical stop 34 has three fingers 84 that line up with the groove 36a. Fingers 84 on the mechanical stop 34 slide into the groove 36 on the mechanical stop 36 and are rotated into place to limit the displacement of the seismic mass 29 (FIG. 1a).

FIG. 1c shows one of the flexure disks 30 in FIG. 1a. As shown, the flexure disk 30 has an inner ring 70, an outer ring 72, and six radial splines generally indicated as 74 connecting the inner ring 70 and the outer ring 72. The scope of the invention is not intended to be limited to any particular type of flexure disk.

The Signal Processing Circuitry

A person skilled in the art would appreciate how the optic fiber Bragg grating sensors are used as sensor elements. The reader is generally referred to U.S. patent Ser. Nos. 08/853,762; 08/853,535; and 08/853,402, all filed May. 9, 1997, all assigned to the assignee of the present application, and hereby incorporated by reference.

As described therein, a data acquisition unit has a broadband light source or laser diode with suitable photo optic couplers. Demodulators and filtering equipment can be used to monitor the Bragg grating wavelength shift as the grating is subjected to strain. If more than one grating is used, wave division multiplexing techniques can be utilized to discriminate the value or change in wavelength of each individual Bragg grating. The fiber optic connection between the acquisition unit and the washer is simply a length of fiber, and the actual decoding can be performed in a safe area if necessary. A readout device can be positioned so that a continuous reading of strain can be provided.

When such a fiber grating is illuminated, it reflects a narrow band of light at a specified wavelength. However, a measurand, such as strain induced by pressure or temperature, will induce a change in the fiber grating spacing, which changes the wavelength of the light it reflects. The value (magnitude) of the measurand is directly related to the wavelength reflected by the fiber grating and can be determined by detecting the wavelength of the reflected light.

Other optical signal analysis techniques may be used with the present invention such as the necessary hardware and software to implement the optical signal diagnostic equipment disclosed in U.S. Pat. Nos. 4,996,419; 5,361,130; 5,401,956; 5,426,297; and/or 5,493,390, all of which are hereby incorporated by reference.

As is well known in the art, there are various optical signal analysis approaches which may be utilized to analyze return signals from Bragg gratings. These approaches may be generally classified in the following four categories:

1. Direct spectroscopy utilizing conventional dispersive elements such as line gratings, prisms, etc., and a linear array of photo detector elements or a CCD array.
2. Passive optical filtering using both optics or a fiber device with wavelength-dependent transfer function, such as a WDM coupler.
3. Tracking using a tuneable filter such as, for example, a scanning Fabry-Perot filter, an acousto-optic filter such as the filter described in the above referenced U.S. Pat. No. 5,493,390, or fiber Bragg grating based filters.
4. Interferometric detection.

The particular technique utilized will vary, and will depend on the Bragg wavelength shift magnitude (which depends on the sensor design) and the frequency range of the measurand to be detected. The scope of the invention is not intended to be limited to any particular optical signal analysis approach.

Figure 2:
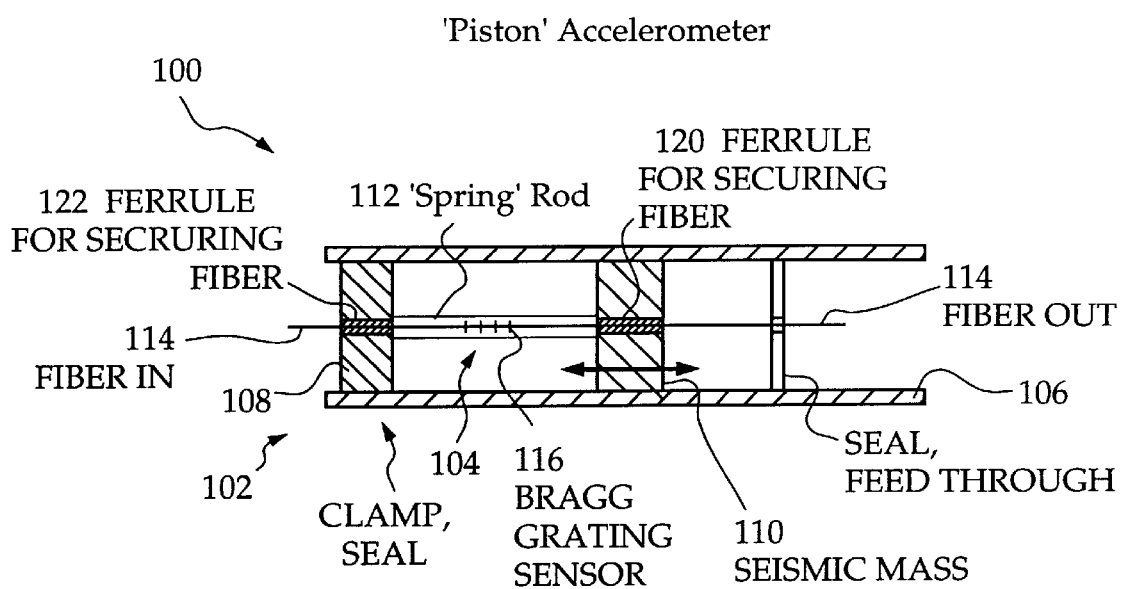
FIG. 2 is a diagram of a piston accelerometer.

"Piston" Accelerometer in FIG. 2

FIG. 2 shows a "Piston" accelerometer generally indicated as 100 having a main body generally indicated as 102 and a Bragg grating sensor means generally indicated as 104.

The main body 102 has a housing 106 with a wall 108. The main body 102 also has a seismic mass 110 arranged on a spring rod 112 that responds to the acceleration along a single axis, for providing the force along the single axis.

The Bragg grating sensor mean 104 includes a first optical fiber 114, and a Bragg grating sensor 116 is connected on one end by a ferrule 120 to the seismic mass 110 and connected on the other end by a ferrule 122 to the wall 108 of the housing 106 of the accelerometer 100. In operation, the Bragg grating sensor 116 responds to an optical signal transmitted on the fiber 114, and further responds to the force provided by the seismic mass 110, for providing a Bragg grating sensor signal containing information about the acceleration along the single axis. Similar to that discussed above, the optical fiber 114 receives the optical signal light from a light source (not shown) and provides the Bragg grating sensor signal to a detector (not shown).

Figure 3A:
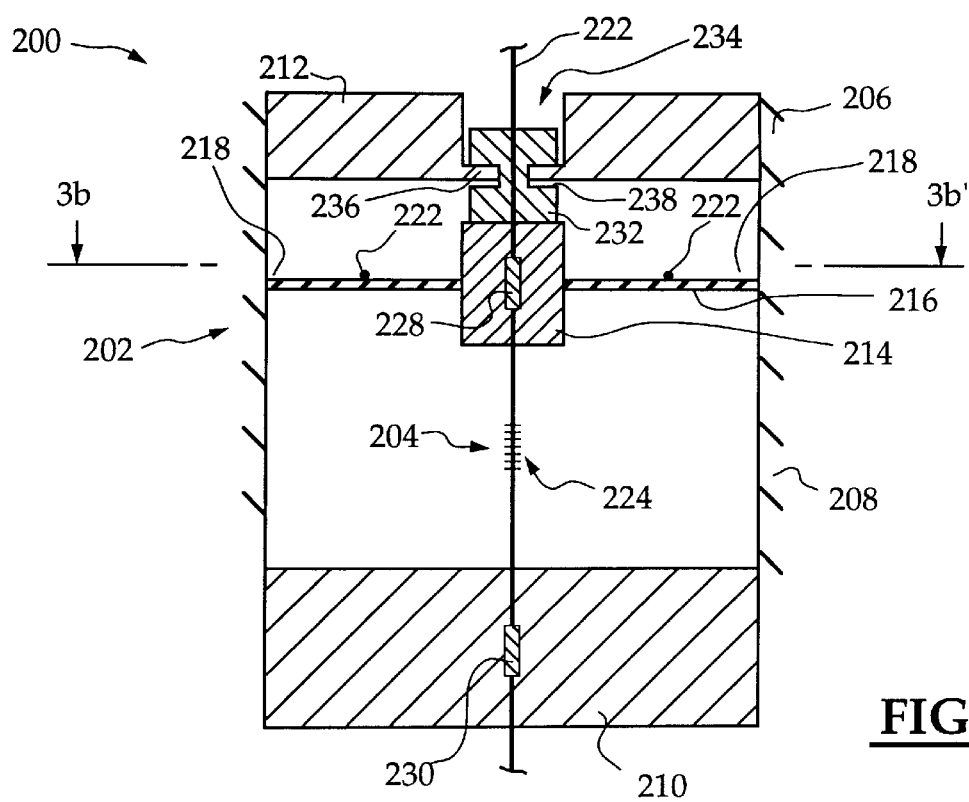
FIG. 3a is a diagram showing a side view of an edge clamped diaphragm accelerometer.
Figure 3B:
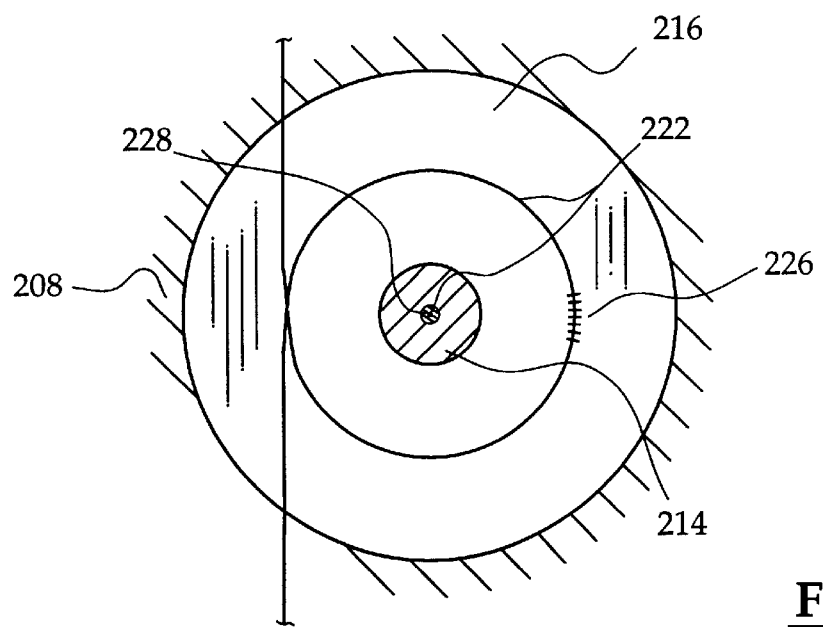
FIG. 3b is a diagram showing a top view of the edge clamped diaphragm accelerometer in FIG. 3a along lines 3b–3b'.

Edged Clamped Diaphragm-Mass Accelerometer in FIGS. 3a, 3b

FIGS. 3a and 3b show an edge clamped diaphragm-mass accelerometer generally indicated as 200 having a main body generally indicated as 202 and a Bragg grating sensor means generally indicated as 204.

In FIG. 3a, the main body 202 has a housing 206 having a cylindrical wall 208, a removable bottom wall 210 and a removable top wall 212. The main body 202 also has a seismic mass 214 fixedly arranged on a diaphragm 216 having a circumferential edge generally indicated as 218 circumferentially clamped to the cylindrical wall 208. The scope of the invention is not intended to be limited to any particular manner in which the seismic mass 214 is arranged on the diaphragm 216, or the diaphragm 216 is clamped to the cylindrical wall 208. In operation, the seismic mass 214 responds to an acceleration, for providing two forces each having a respective force component in one of two orthogonal axes.

The Bragg grating sensor means 204 includes one or more optical fibers 222, a first Bragg grating sensor 224 and a second Bragg grating sensor 226. As shown, the fiber 222 is a single fiber that passes through the seismic mass 214 and the diaphragm 216. The scope of the invention is not intended to be limited to the number of optical fibers such as optical fiber 222, because embodiments are envisioned where separate optical fibers may be used having separate Bragg grating sensors that receive separate optical signals and provide separate Bragg grating sensor signals.

The first Bragg grating sensor 224 is mounted between the seismic mass 214 and the removable bottom wall 210 and the removable top wall 212 of the housing 206 along one orthogonal axis by ferrules 228, 230, which are designed to retain the optical fiber 222 in a manner similar to the way ferrules 54, 58 retain the optical fiber 50 in FIG. 1a. The first Bragg grating sensor 224 is typically prestrained in a manner similar to the Bragg grating sensor 52 in FIG. 1a.

The second Bragg grating sensor 226 is embedded in or arranged on the diaphragm 216 between the clamped edge 218 and the seismic mass 214 along another orthogonal axis. The optical fiber 222 and the second Bragg grating sensor 226 may be either glued or epoxied onto the diaphragm 216. The scope of the invention is not intended to be limited to any particular physical connection between the optical fiber 222, the second Bragg grating sensor 226 and the diaphragm 216. In operation, the Bragg grating sensor means 204, including the first Bragg grating sensor 224 and the second Bragg grating sensor 226, responds to the two forces each having a respective force component in one of two orthogonal axes, and further responds to an optical signal along the optical fiber 222, for providing a Bragg grating signal containing information about the two forces acting on the seismic mass 214. Similar to that discussed above, the optical fiber receives the optical signal 222 light from a light source (not shown) and provides the Bragg grating sensor signal to a detector (not shown).

Further, the main body 202 also has a mechanical stop 232 arranged in an aperture generally indicated as 234 in the top housing wall 212. As shown, the top housing wall 212 has a circumferential rim 236, and the mechanical stop 232 has a corresponding circumferential channel generally indicated as 238 for receiving the circumferential rim 236. In operation, the mechanical stop 232 limits the movement of the seismic mass 214, that, in effect, limits the possible strain on the Bragg grating sensor 224 so it does break from overstretching. As shown, the optical fiber 222 passes through the mechanical stop 232 and is not fixedly retained therein. Any person skilled in the art would appreciate how to design the circumferential rim 236 of the top housing wall 212 in relation to the corresponding circumferential channel 238 of the mechanical stop 232 to achieve the desired tolerance to limit the possible strain on the Bragg grating sensor 224.

As shown in FIG. 3b, the optical fiber 222 may pass through the cylindrical wall 208, although embodiments are envisioned in which the optical fiber 222 may pass though the bottom wall 210 or the top wall 212. The scope of the invention is not intended to be limited to any particular manner in which the optic fiber 222 is passed through the main body 202 shown in FIGS. 8a, 8b.

Figure 4A:
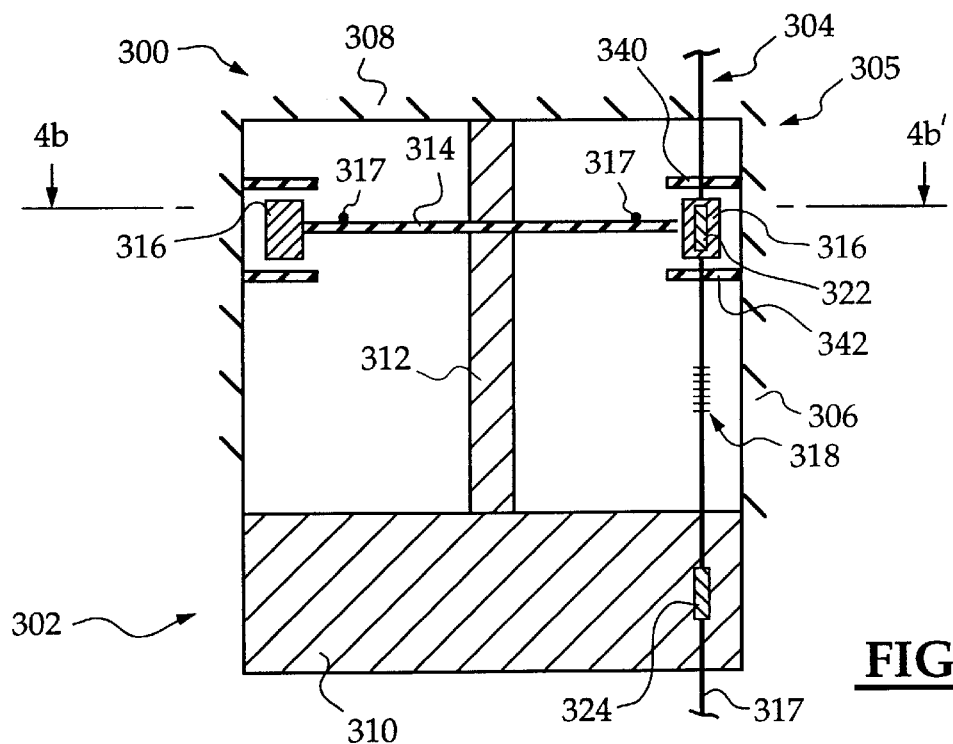
FIG. 4a is a diagram showing a side view of a center clamped diaphragm accelerometer.
Figure 4B:
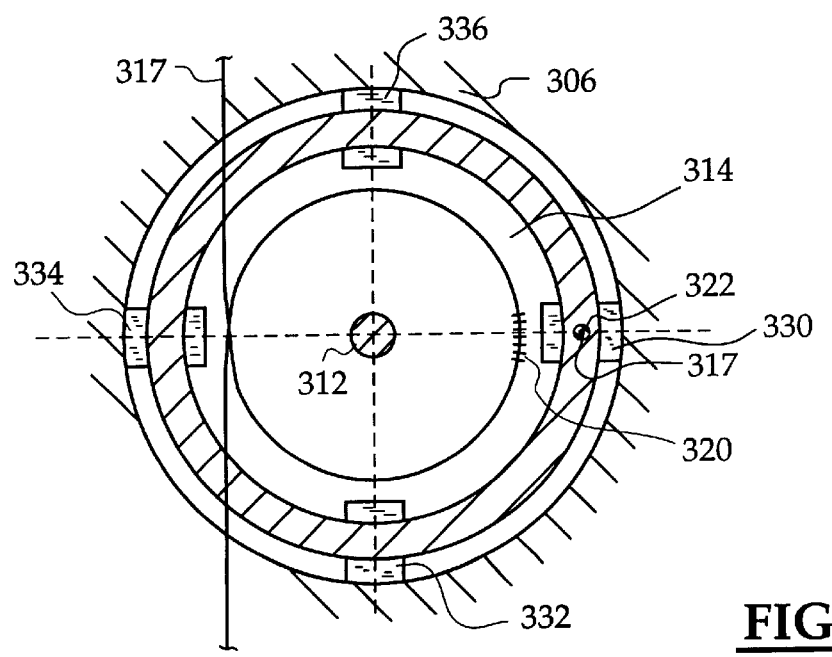
FIG. 4b is a diagram showing a top view of the center clamped diaphragm accelerometer shown in FIG. 4a along lines 4b–4b'.

Center clamped Diaphragm Accelerometer in FIGS. 4a, 4b

FIGS. 4a, 4b show a center clamped diaphragm accelerometer generally indicated as 300 having a main body generally indicated as 302 and a Bragg grating sensor means generally indicated as 304.

In FIG. 4(a), the main body 302 has a housing generally indicated as 305 having a cylindrical wall 306, a top wall 308, a removable bottom wall 310, and a center support 312. The main body 302 also has a diaphragm 314 fixedly arranged on the center support 312, and also has a circumferential seismic mass generally indicated as 316 arranged on a circumferential edge of the diaphragm 314. The scope of the invention is not intended to be limited to any particular manner in which the diaphragm 314 is arranged on the center support 312, or the circumferential seismic mass 316 is arranged on the circumferential edge of the diaphragm 314. Moreover, the scope of the invention is not intended to be limited to any particular shape of the seismic mass 316, which is described as being circumferential although embodiments are envisioned where the seismic mass 316 other shapes as well as including a plurality of masses arranged around the diaphragm 314. In operation, the seismic mass 316 responds to an acceleration, for providing two forces, each having a respective force component in one of two orthogonal axes.

The Bragg grating sensor means 304 includes an optical fiber 317, a first Bragg grating sensor 318 and a second Bragg grating sensor 320.

The first Bragg grating sensor 318 is mounted between the seismic mass 316 and the removable bottom wall 310 along one orthogonal axis by ferrules 322, 324, which are designed to retain the optical fiber 317 in a manner similar to the way ferrules 54, 58 retain the optical fiber 50 in FIG. 1a. The first Bragg grating sensor 318 is typically prestrained in a manner similar to the Bragg grating sensor 52 in FIG. 1a.

The second Bragg grating sensor 320 is embedded in or arranged on the diaphragm 314 and mounted between the center support 312 and the seismic mass 316 along another orthogonal one axis. The optical fiber 317 and the second Bragg grating sensor 320 may be either glued or epoxied onto the diaphragm 314. The scope of the invention is not intended to be limited to any particular physical connection between the optical fiber 317, the second Bragg grating sensor 320, and the diaphragm 314. In operation, the Bragg grating sensor means 304, including the first Bragg grating sensor 318 and the second Bragg grating sensor 320, responds to the two forces each having a respective force component in one of two orthogonal axes, and further responds to an optical signal along the optical fiber 317, for providing a Bragg grating signal containing information about the two forces acting on the seismic mass 316. Similar to that discussed above, the optical fiber 317 receives the optical signal light from a light source (not shown) and provides the Bragg grating sensor signal to a detector (not shown).

Further, the main body 302 also has mechanical stops 330, 332, 334, 336 arranged around the cylindrical wall 306. As shown, the mechanical stop 330 has an upper stopping member 340 and a lower stopping member 342. The mechanical stops 332, 334 and 336 are similarly designed. In operation, the mechanical stop 330 limits the movement of the seismic mass 316, that, in effect, limits the possible strain on the Bragg grating sensor 318 so it does break from overstretching. As shown, the optical fiber 317 passes through the upper stopping member 340 and the lower stopping member 342 and is not fixedly retained therein. Any person skilled in the art would appreciate how to design the mechanical stops 330, 332, 334, 336 in relation to the seismic mass 316 to achieve the desired tolerance to limit the possible strain on the Bragg grating sensor 318.

As shown in FIG. 4b, the optical fiber 317 may pass through the cylindrical wall 306, although embodiments are envisioned in which the optical fiber 317 may pass though the top wall 308 or the removable bottom wall 310. The scope of the invention is not intended to be limited to any particular manner in which the optic fiber 317 is passed through the main body 302 shown in FIGS. 9a, 9b.

Figure 5A:
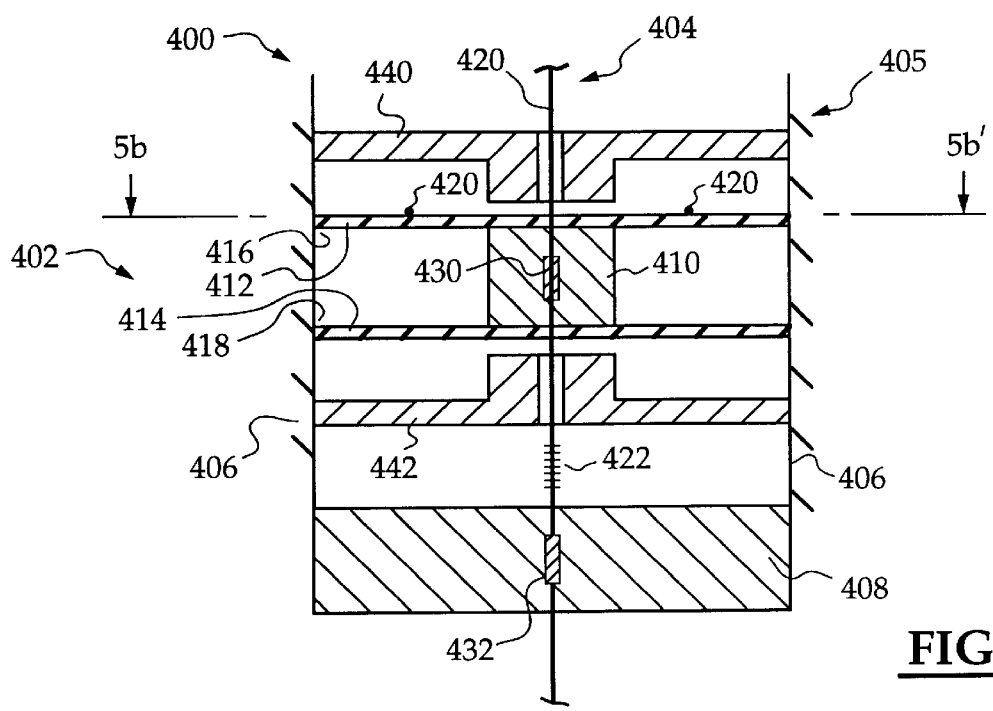
FIG. 5a is a diagram showing a side view of a dual diaphragm—single mass accelerometer.
Figure 5B:
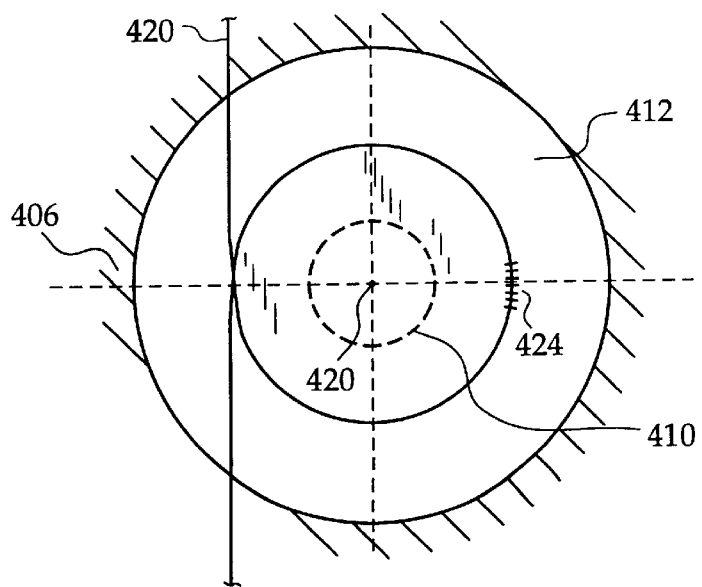
FIG. 5b is a diagram showing a side view of the dual diaphragm—single mass accelerometer shown in FIG. 5a along lines 5b–5b'.

Dual Diaphragm, single Mass Accelerometer in FIGS. 5a, 5b

FIGS. 5a, 5b show a dual diaphragm, single mass accelerometer generally indicated as 400 having a main body generally indicated as 402 and a Bragg grating sensor means generally indicated as 404.

In FIG. 5a, the main body 402 has a housing generally indicated as 405 having a cylindrical housing wall 406 and a bottom wall 408. The main body 402 also has a seismic mass 410 fixedly arranged between two diaphragms 412, 414, each having a circumferential edge generally indicated as 416, 418 circumferentially clamped to the cylindrical wall 406. The scope of the invention is not intended to be limited to any particular manner in which the seismic mass 410 is arranged on the diaphragms 412, 414, or the diaphragms 412, 414 are clamped to the cylindrical wall 406. In operation, the seismic mass 410 responds to an acceleration, for providing two forces each having a respective force component in one of two orthogonal axes.

The Bragg grating sensor means 404 includes an optical fiber 420 and two Bragg grating sensors 422, 424.

The first Bragg grating sensor 422 is mounted between the seismic mass 410 and the bottom wall 408 along one orthogonal axis by ferrules 430, 432 which are designed to retain the optical fiber 222 in a manner similar to the way ferrules 54, 58 retain the optical fiber 50 in FIG. 1a. The first Bragg grating sensor 422 is typically prestrained in a manner similar to the Bragg grating sensor 52 in FIG. 1a.

The second Bragg grating sensor 424 is embedded in or arranged on one of the diaphragms such as the diaphragm 416 between the clamped edge 416 and the seismic mass 410 along another orthogonal axis. The optical fiber 420 and the second Bragg grating sensor 424 may be either glued or epoxied onto the diaphragm 416. The scope of the invention is not intended to be limited to any particular physical connection between the optical fiber 420, the second Bragg grating sensor 424 and the diaphragm 416. In operation, the Bragg grating sensor means 404, including the first Bragg grating sensor 422 and the second Bragg grating sensor 424, responds to the two forces each having a respective force component in one of two orthogonal axes, and further responds to an optical signal along the optical fiber 420, for providing a Bragg grating signal containing information about the two forces acting on the seismic mass 410. Similar to that discussed above, the optical fiber receives the optical signal 420 light from a light source (not shown) and provides the Bragg grating sensor signal to a detector (not shown).

Further, the main body 402 also has mechanical stops 440, 442 that limits the movement of the seismic mass 410 to limit the possible strain on the Bragg grating sensor 422 so it does break from overstretching. As shown, the optical fiber 420 passes through the mechanical stops 440, 442 and is not fixedly retained therein. Any person skilled in the art would appreciate how to design the mechanical stops 440, 442 to achieve the desired tolerance to limit the possible strain on the Bragg grating sensor 422.

As shown in FIG. 5b, the optical fiber 420 may pass through the cylindrical wall 406, although embodiments are envisioned in which the optical fiber 420 may pass though the bottom wall 408. The scope of the invention is not intended to be limited to any particular manner in which the optic fiber 420 is passed through the main body 402 shown in FIGS. 10a, 10b.

Cantilever Plate Accelerometers in FIGS. 6a, 6b, 6c

FIG. 6a shows a cantilever plate accelerometer generally indicated as 500 having a main body generally indicated as 502 and a Bragg grating sensor means generally indicated as 504.

In FIG. 6a, the main body 502 has a housing generally indicated as 505 having a cylindrical housing wall 506 and a bottom wall 508. The main body 502 also has a seismic mass 510 fixedly arranged on the cylindrical housing wall 506. In operation, the seismic mass 510 responds to an acceleration, for providing a force along an axis.

The Bragg grating sensor means 504 includes an optical fiber 520 and a Bragg grating sensor 522.

The Bragg grating sensor 522 is mounted between the seismic mass 510 and the bottom wall 508 along an axis by ferrules 530, 532 which are designed to retain the optical fiber 522 in a manner similar to the way ferrules 54, 58 retain the optical fiber 50 in FIG. 1a. The Bragg grating sensor 522 is typically prestrained in a manner similar to the Bragg grating sensor 52 in FIG. 1a.

Further, the main body 502 also has mechanical stops 540, 542 that limits the movement of the seismic mass 510 to limit the possible strain on the Bragg grating sensor 522 so it does break from overstretching. As shown, the optical fiber 520 passes through the mechanical stops 540, 542 and is not fixedly retained therein. Any person skilled in the art would appreciate how to design the mechanical stops 540, 542 to achieve the desired tolerance to limit the possible strain on the Bragg grating sensor 522.

As shown in FIG. 6a, the optical fiber 520 may pass through the bottom wall 508, the seismic mass 510, and the mechanical stops 540, 542, although embodiments are envisioned in which the optical fiber 520 may pass though the wall 506. The scope of the invention is not intended to be limited to any particular manner in which the optic fiber 520 is passed through the main body 502 shown in FIG. 6a.

FIGS. 6b and 6c show an alternative cantilever plate accelerometers generally indicated as 550, having a respective main body generally indicated as 552 and a respective Bragg grating sensor means generally indicated as 554.

In FIGS. 6b and 6c, the main body 552 has a housing generally indicated as 555 having a cylindrical housing wall 556. The main body 552 also has a seismic mass 560 fixedly arranged on a support member 561 connected to the cylindrical housing wall 556. In operation, the seismic mass 560 responds to an acceleration, for providing two forces each having a respective force component in one of two orthogonal axes.

As shown in FIG. 6b, the Bragg grating sensor means 554 includes an optical fiber 570, a first Bragg grating sensor 572 and a second Bragg grating sensor 574.

The first Bragg grating sensor 572 and the second Bragg grating sensor 574 are embedded in or arranged on the support member 561. The scope of the invention is not intended to be limited to the position of the first and second Bragg grating sensor 572, 574 on the support member 561. The optical fiber 570 and the second Bragg grating sensor 574 may be either glued or epoxied onto the support member 561. In operation, the Bragg grating sensor means 554, including the first Bragg grating sensor 572 and the second Bragg grating sensor 574, responds to the two forces each having a respective force component in one of two orthogonal axes, and further responds to an optical signal along the optical fiber 570, for providing a Bragg grating signal containing information about the two forces acting on the seismic mass 560. Similar to that discussed above, the optical fiber receives the optical signal 570 light from a light source (not shown) and provides the Bragg grating sensor signal to a detector (not shown).

Figure 7A:
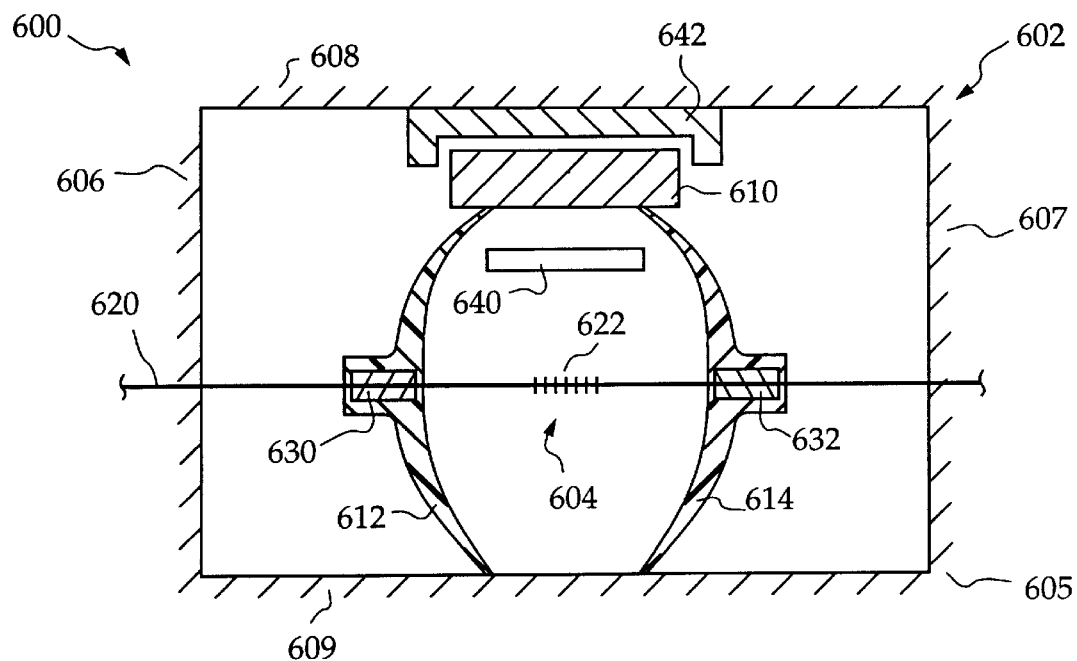
FIG. 7a is a diagram of a side of one embodiment of a flextensional accelerometer.
Figure 7B:
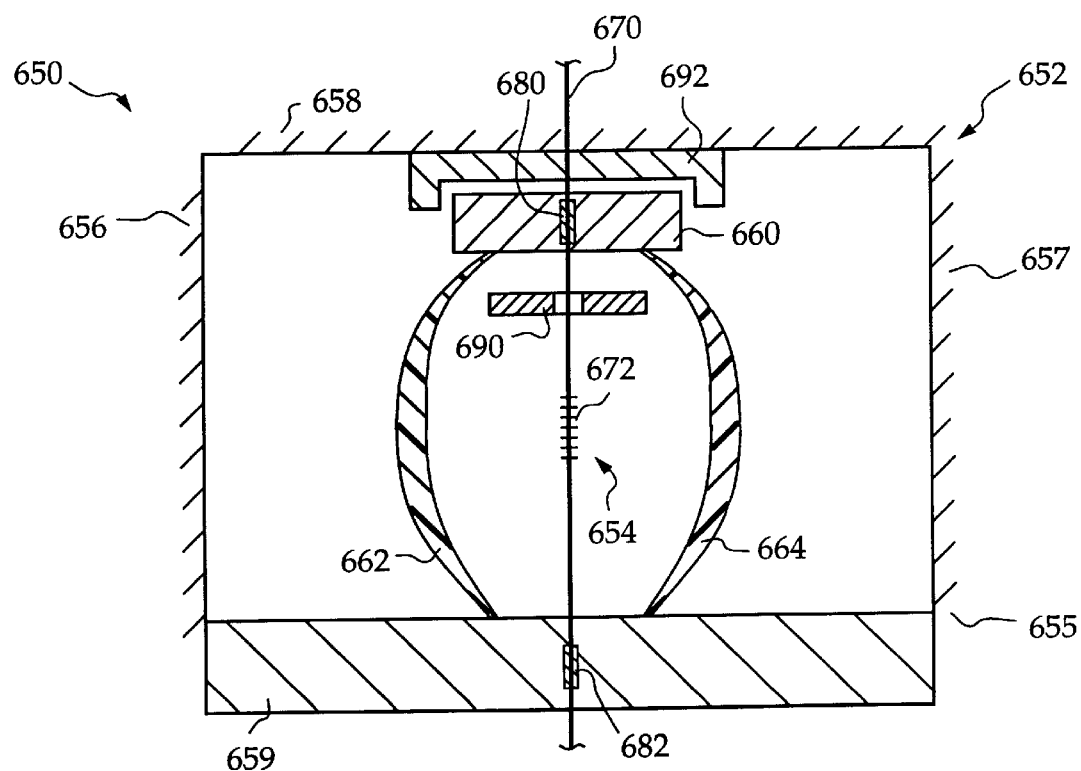
FIG. 7b is a diagram of a side of another embodiment of a flextensional accelerometer.

Flextensional Accelerometers in FIGS. 7a, 7b

FIG. 7a shows a flextensional accelerometer generally indicated as 600 having a respective main body generally indicated as 602 and a respective Bragg grating sensor means generally indicated as 604.

In FIG. 7a, the main body 602 has a housing generally indicated as 605 having side walls 606, 607 and top and bottom wall 608, 609. The main body 602 also has a seismic mass 610 fixedly arranged on flextension members 612, 614. In operation, the seismic mass 610 responds to an acceleration, for providing a force along an axis.

The Bragg grating sensor means 604 includes an optical fiber 620 and a Bragg grating sensor 622.

The Bragg grating sensor 622 is mounted between the flextensional members 612, 614 along the axis by ferrules 630, 632 which are designed to retain the optical fiber 622 in a manner similar to the way ferrules 54, 58 retain the optical fiber 50 in FIG. 1a. The Bragg grating sensor 622 is typically prestrained in a manner similar to the Bragg grating sensor 52 in FIG. 1a.

Further, the main body 602 also has mechanical stops 640, 642 that limits the movement of the seismic mass 610 to limit the possible strain on the Bragg grating sensor 622 so it does break from overstretching. Any person skilled in the art would appreciate how to design the mechanical stops 630, 632 to achieve the desired tolerance to limit the possible strain on the Bragg grating sensor 622.

As shown in FIG. 7a, the optical fiber 620 may pass through the side walls 606, 607, although embodiments are envisioned in which the optical fiber 620 may pass though the top and bottom walls 608, 609. The scope of the invention is not intended to be limited to any particular manner in which the optic fiber 620 is passed through the main body 602 shown in FIG. 7a.

FIG. 7b shows an alternative design for a flextensional accelerometer generally indicated as 650 having a respective main body generally indicated as 652 and a respective Bragg grating sensor means generally indicated as 654.

In FIG. 7b, the main body 652 has a housing generally indicated as 655 having side walls 656, 657 and top and bottom wall 658, 659. The main body 652 also has a seismic mass 660 fixedly arranged on flextension members 662, 664. In operation, the seismic mass 660 responds to an acceleration, for providing a force along an axis.

The Bragg grating sensor means 654 includes an optical fiber 670 and a Bragg grating sensor 672.

The Bragg grating sensor 672 is mounted between the seismic mass 660 and the bottom wall 659 along the axis by ferrules 680, 682 which are designed to retain the optical fiber 672 in a manner similar to the way ferrules 54, 58 retain the optical fiber 50 in FIG. 1a. The Bragg grating sensor 672 is typically prestrained in a manner similar to the Bragg grating sensor 52 in FIG. 1a.

Further, the main body 652 also has mechanical stops 690, 692 that limits the movement of the seismic mass 660 to limit the possible strain on the Bragg grating sensor 672 so it does break from overstretching. Any person skilled in the art would appreciate how to design the mechanical stops 680, 682 to achieve the desired tolerance to limit the possible strain on the Bragg grating sensor 672.

As shown in FIG. 7b, the optical fiber 670 may pass through the top and bottom walls 658, 659, although embodiments are envisioned in which the optical fiber 520 may pass though the side walls 656, 657. The scope of the invention is not intended to be limited to any particular manner in which the optic fiber 670 is passed through the main body 652 shown in FIG. 7b.

Figure 8:
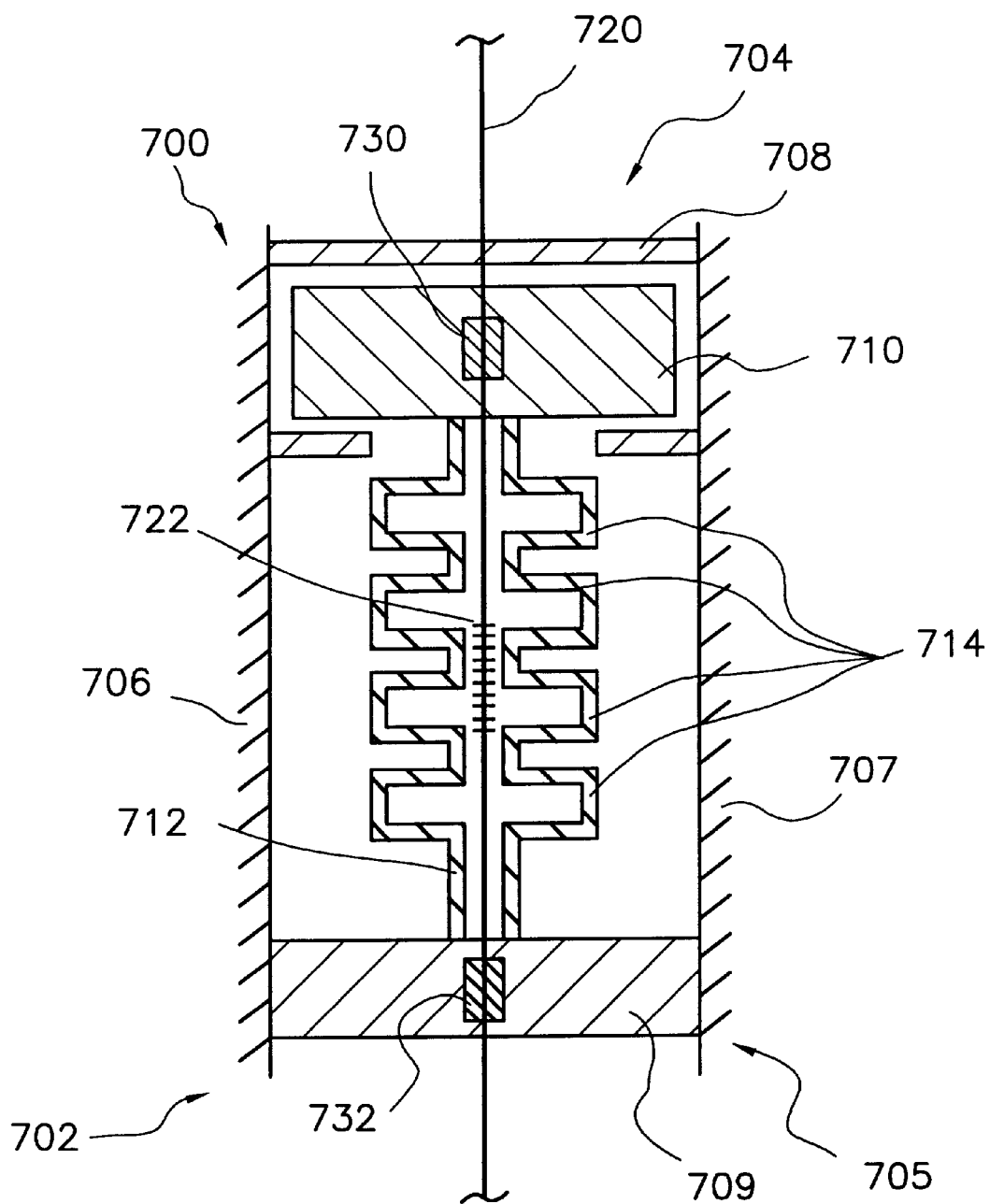
FIG. 8 is a diagram of a side view of an accelerometer having a bellows design.

A Bellows-like Accelerometer in FIG. 8

FIG. 8 shows an alternative design for a bellows-like accelerometer generally indicated as 700 having a main body generally indicated as 702 and a Bragg grating sensor means generally indicated as 704.

In FIG. 8, the main body 702 has a housing generally indicated as 705 having side walls 706, 707 and top and bottom walls 708, 709. The main body 702 also has a seismic mass 710 fixedly arranged on a bellows 712 having four convolutions 714. In operation, the seismic mass 710 responds to an acceleration, for providing a force along an axis.

The Bragg grating sensor means 704 includes an optical fiber 720 and a Bragg grating sensor 722.

The Bragg grating sensor 722 is mounted between the seismic mass 710 and the bottom wall 709 along the axis by ferrules 730, 732 which are designed to retain the optical fiber 672 in a manner similar to the way ferrules 54, 58 retain the optical fiber 50 in FIG. 1a. The Bragg grating sensor 722 is typically prestrained in a manner similar to the Bragg grating sensor 52 in FIG. 1a.

Further, the main body 702 also has uses the top wall 708 as one mechanical stop and also has another mechanical stop 740 that limits the movement of the seismic mass 710 to limit the possible strain on the Bragg grating sensor 722 so it does break from overstretching. Any person skilled in the art would appreciate how to design the mechanical stops 708, 740 to achieve the desired tolerance to limit the possible strain on the Bragg grating sensor 722.

Figure 9:
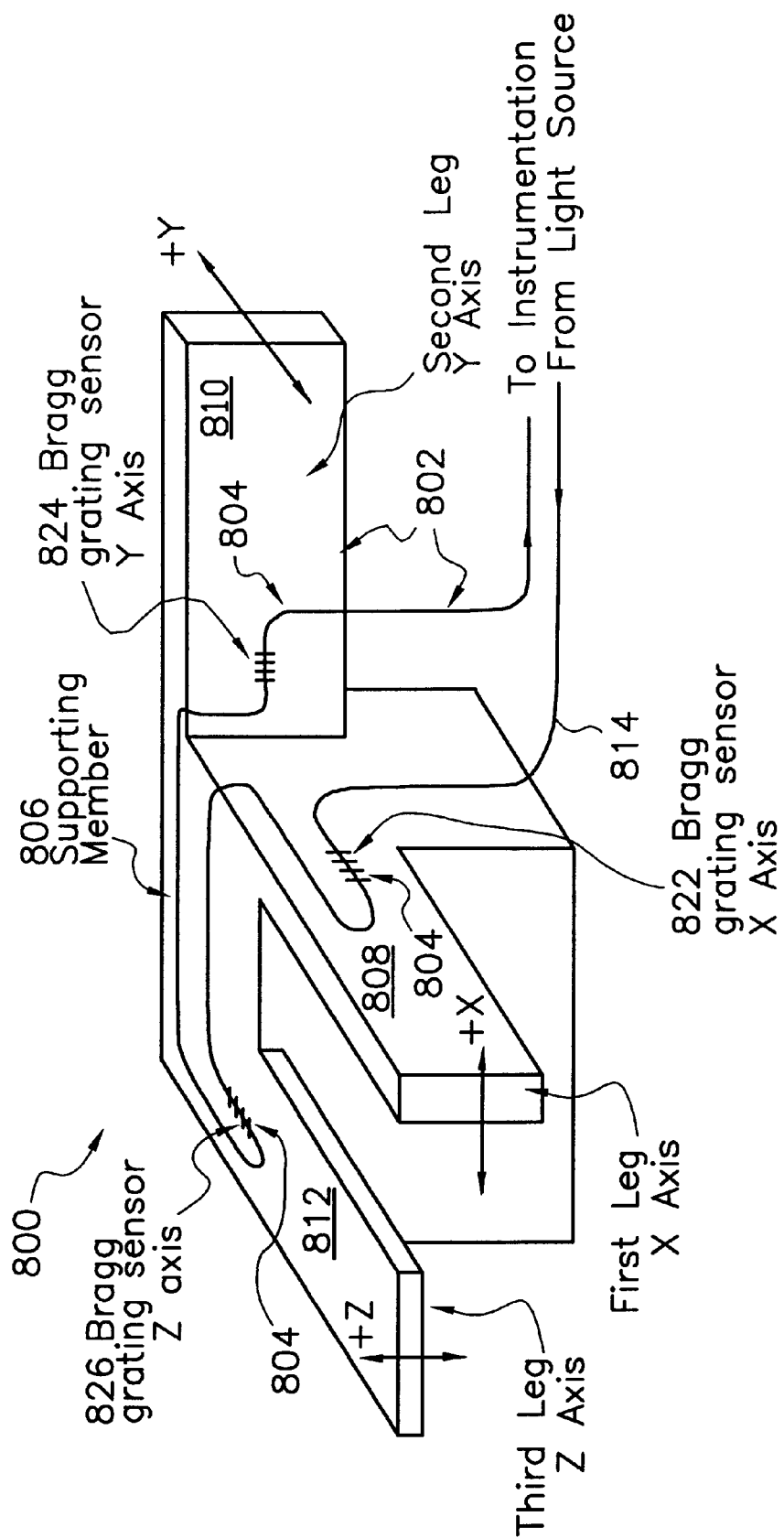
FIG. 9 is a diagram of an accelerometer for sensing acceleration in three orthogonal axes.

A Three Orthogonal Axes Accelerometer in FIG. 9

FIG. 9 shows a three orthogonal axes accelerometer generally indicated as 800 having a main body generally indicated as 802 and a Bragg grating sensor means generally indicated as 804.

The main body 802 includes a supporting member 806 having three orthogonally-extending beams 808, 810, 812. The three orthogonally-extending beams 808, 810, 812 respond to the acceleration, for providing three forces, each having a respective force component in one of three orthogonal axes.

The Bragg grating sensor means 804 includes an optical fiber 814 and three Bragg grating sensors 816, 818, 820. Each Bragg grating sensor 816, 818, 820 responds to a respective force, and each further responds to an optical signal, for providing three Bragg grating sensor signals containing information about a respective acceleration in the three orthogonal axes.

As shown, a first Bragg grating sensor 822 is embedded in or arranged on a first orthogonally-extending beam 808 along the X axis; a second Bragg grating sensor 824 is embedded in or arranged on a second orthogonally-extending beam 810 along the Y axis; and a third Bragg grating sensor 826 is embedded in or arranged on a third orthogonally-extending beam 812 along the Z axis. The scope of the invention is not intended to be limited to any particular physical connection between the optical fiber 814 and the three orthogonally-extending beams 808, 810, 812. Similar to that discussed above, the optical fiber receives the optical signal light from a light source (not shown) and provides the Bragg grating sensor signal to a detector (not shown).

Figure 10:
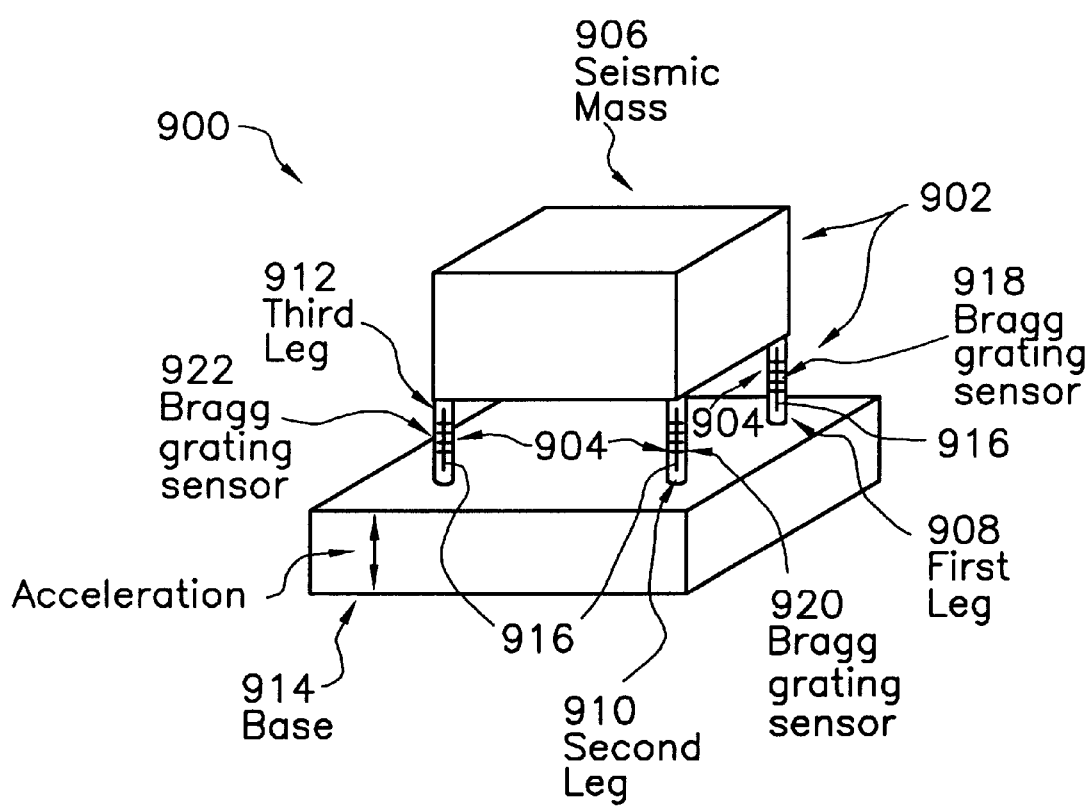
FIG. 10 is a diagram of an accelerometer for sensing acceleration in three parallel axes.

A Three Parallel Axes Accelerometer in FIG. 10

FIG. 10 shows a three axis accelerometer generally indicated as 900 having a main body generally indicated as 902 and a Bragg grating sensor means generally indicated as 904.

The main body 902 has a seismic mass 906 having at least three legs 908, 910, 912 resting on a base 914. The seismic mass 906 responds to the acceleration of the base 914, for providing three forces, each having a respective force component in one of three axes.

The Bragg grating sensor means includes an optical fiber 916 and three Bragg grating sensors 918, 920, 922. Each Bragg grating sensor 918, 920, 922 responds to a respective force, and each further responds to the optical signal, for providing three Bragg grating sensor signals containing information about a respective acceleration in the three axes.

As shown, a first Bragg grating sensor 918 is embedded in or arranged on a first leg 908 along a first axis; a second Bragg grating sensor 920 is embedded in or arranged on a second leg 910 along a second axis; and a third Bragg grating sensor 922 is embedded in or arranged on a third leg 912 along a third axis. The optical fiber 916 passes through the seismic mass 906. The scope of the invention is not intended to be limited to any particular physical connection between the optical fiber 916 and the legs 908, 910, 912. Similar to that discussed above, the optical fiber receives the optical signal light from a light source (not shown) and provides the Bragg grating sensor signal to a detector (not shown).

Figure 11:
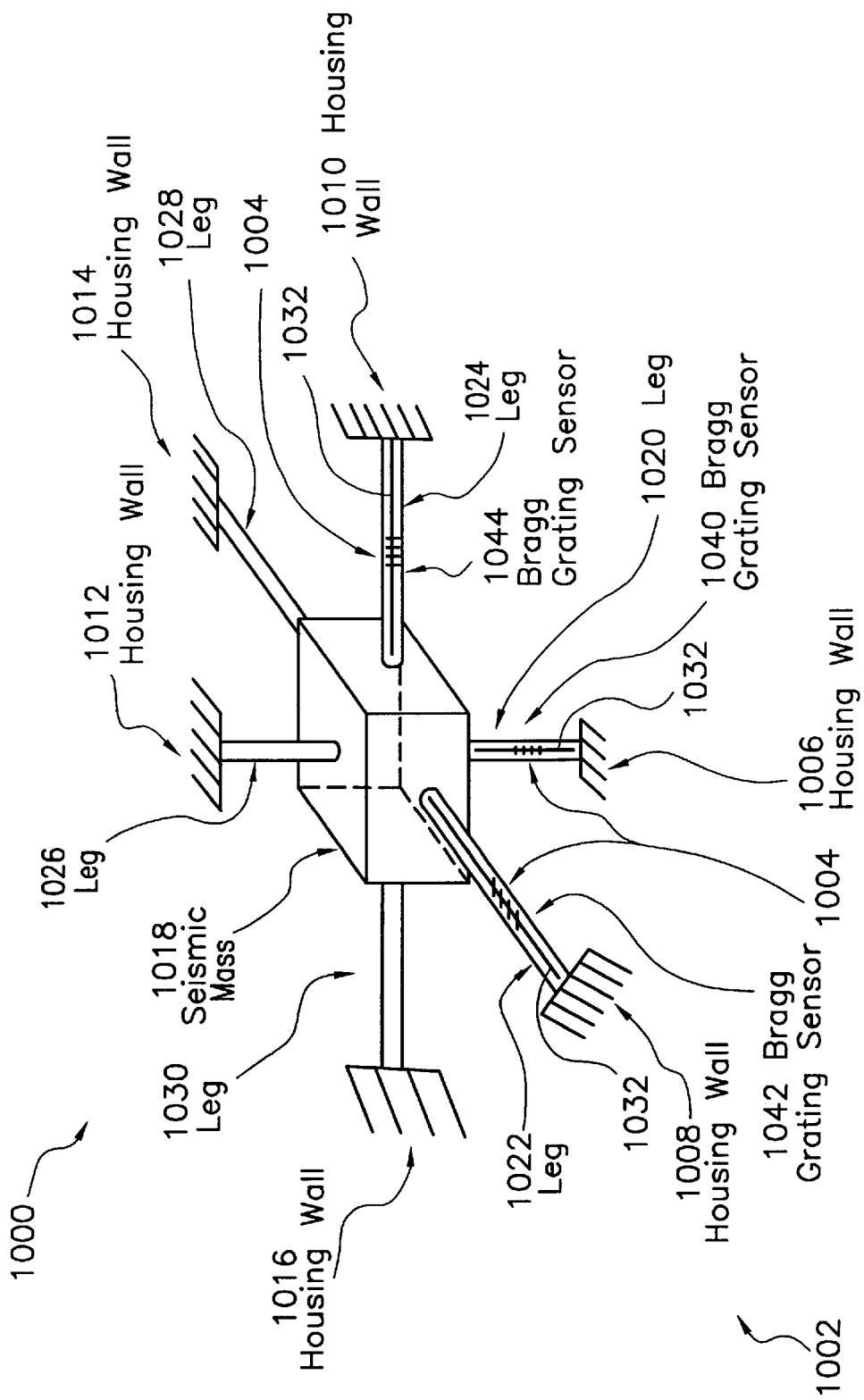
FIG. 11 is a diagram of an accelerometer for sensing acceleration on a supported body in three orthogonal axes.

A Second Three Orthogonal Axes Accelerometer in FIG. 11

FIG. 11 shows a three orthogonal axes accelerometer generally indicated as 1000 having a main body generally indicated as 1002 and a Bragg grating sensor means generally indicated as 1004.

The main body 1002 has a housing with six walls 1006, 1008, 1010, 1012, 1014, 1016. The main body also has a seismic mass 1018 connected by six legs 1020, 1022, 1024, 1026, 1028, 1030 to the six walls 1006, 1008, 1010, 1012, 1014, 1016. The seismic mass 1018 responds to the acceleration, for providing a force having a component in one of three axes.

The Bragg grating sensor means 1004 includes an optical fiber 1032 and three or more Bragg grating sensors 1040, 1042, 1044. Each Bragg grating sensor 1040, 1042, 1044 responds to the force, and each further responds to an optical signal transmitted on the optical fiber 1032, for providing three or more Bragg grating sensor signals containing information about a respective acceleration in the three axes.

A first Bragg grating sensor 1040 is embedded in or arranged on a first leg 1020 along a first axis; a second Bragg grating sensor 1042 is embedded in or arranged on a second leg 1022 along a second axis; and a third Bragg grating sensor 1044 is embedded in or arranged on a third leg 1046 along a third axis. Embodiments are also envisioned wherein the fourth, fifth and sixth legs have Bragg grating sensors, as well. Moreover, the scope of the invention is not intended to be limited to any particular physical connection between the optical fiber 1032 and the legs 1020, 1022, 1024. Similar to that discussed above, the optical fiber receives the optical signal light from a light source (not shown) and provides the Bragg grating sensor signal to a detector (not shown).

SCOPE OF THE INVENTION

Although the invention has been described and illustrated with respect to exemplary embodiments thereof, the foregoing and various other additions and omissions may be made therein and thereto without departing from the spirit and scope of the present invention.

We claim:

1. An accelerometer, comprising:
   a main body having a housing with a wall, and having a seismic mass means arranged between a diaphragm means and the wall of the housing, the seismic mass means and the diaphragm means responding to an acceleration, for providing a force in at least two orthogonal axes; and
   Bragg grating sensors including an optical fiber having two Bragg gratings disposed therein, a first Bragg grating being disposed in the optical fiber arranged on the diaphragm means, a second Bragg grating being disposed on the optical fiber arranged between the seismic mass means and the wall of the housing, each Bragg grating responsive to the force, and further responsive to an optical signal, for providing respective Bragg grating sensor signals containing information about the acceleration in the at least two orthogonal axes.

2. An accelerometer according to claim 1, wherein the seismic mass means is a mass fixedly arranged on the diaphragm means.

3. An accelerometer according to claim 2,
wherein the diaphragm means has a diaphragm; and
wherein the seismic mass means is arranged at a center of the diaphragm.

4. An accelerometer according to claim 1, wherein the diaphragm means has a diaphragm that is clamped along edges of the wall of the housing.

5. An accelerometer according to claim 1, wherein the first Bragg grating is glued or epoxied onto the diaphragm means.

6. An accelerometer according to claim 1, wherein the optical fiber is connected by ferrules to the seismic mass means and the wall of the housing.

7. An accelerometer according to claim 1, wherein the accelerometer has a mechanical stop arranged between the seismic mass means and the wall of the housing.

8. An accelerometer according to claim 1, wherein the diaphragm means has a diaphragm that is clamped along a center support connected to the wall of the housing.

9. An accelerometer according to claim 8, wherein the seismic mass means includes two masses, each fixedly arranged on a respective edge of the diaphragm means.

10. An accelerometer according to claim 9, wherein the accelerometer has a respective mechanical stop arranged between each of the two masses and the wall of the housing.

11. An accelerometer according to claim 1, wherein the diaphragm means includes two diaphragms and the seismic mass means is arranged therebetween.

12. An accelerometer according to claim 11, wherein the accelerometer has a respective mechanical stop arranged on each side of the two diaphragms and coupled to the wall of the housing.

* * * * *

UNITED STATES PATENT AND TRADEMARK OFFICE
CERTIFICATE OF CORRECTION

PATENT NO. : 6,175,108 B1
DATED : January 16, 2001
INVENTOR(S) : Jones et al.

It is certified that error appears in the above-identified patent and that said Letters Patent is hereby corrected as shown below:

Title page, item [56], References Cited,
U.S. Patent Documents,
Line 12, please delete "Varsai et al." and insert -- Varasi et al. --.

Column 6,
Line 20, please delete "though" and insert -- through --; and
Line 25, delete "Center clamped Diaphragm" and insert
-- Center Clamped Diaphragm --.

Column 7,
Line 33, please delete "though" and insert -- through --; and
Line 38, delete "Dual Diaphragm, single Mass" and insert -- Dual Diaphragm, Single Mass --.

Column 8,
Line 31, please delete "though" and insert -- through --.

Column 9,
Line 4, please delete "though" and insert -- through --.

Column 10,
Lines 6 and 40, please delete "though" and insert -- through --.

Signed and Sealed this

Thirtieth Day of October, 2001

Attest:

NICHOLAS P. GODICI
Attesting Officer  Acting Director of the United States Patent and Trademark Office